March 12, 1957     W. G. HUNT     2,784,999
PORTABLE CAFETERIA BODY WITH DISH COMPARTMENTS
Filed March 28, 1955     5 Sheets-Sheet 1

WILLIAM G. HUNT,
INVENTOR.

BY Eaton + Bell

ATTORNEYS

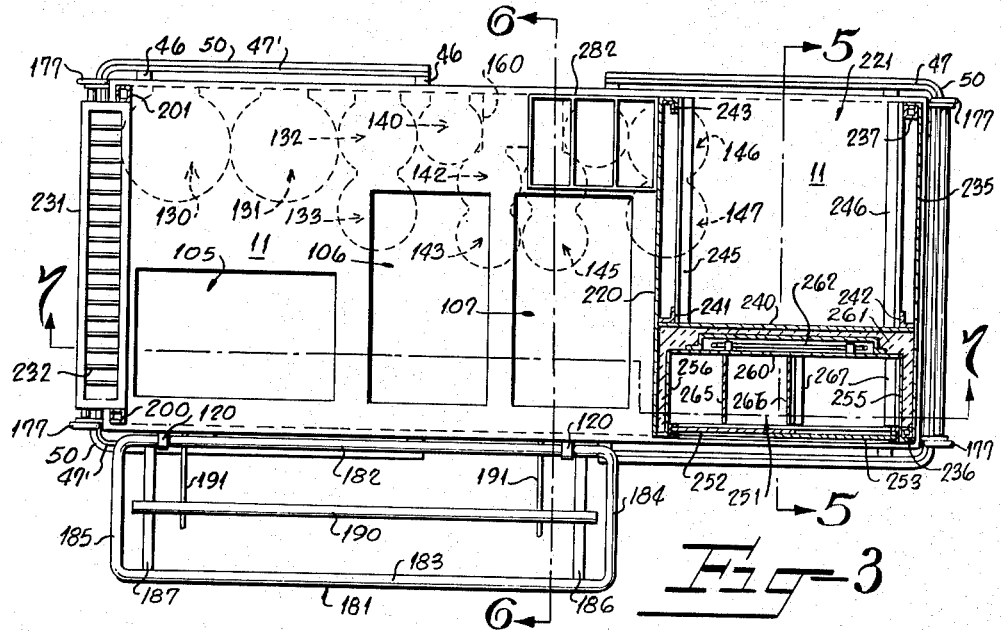
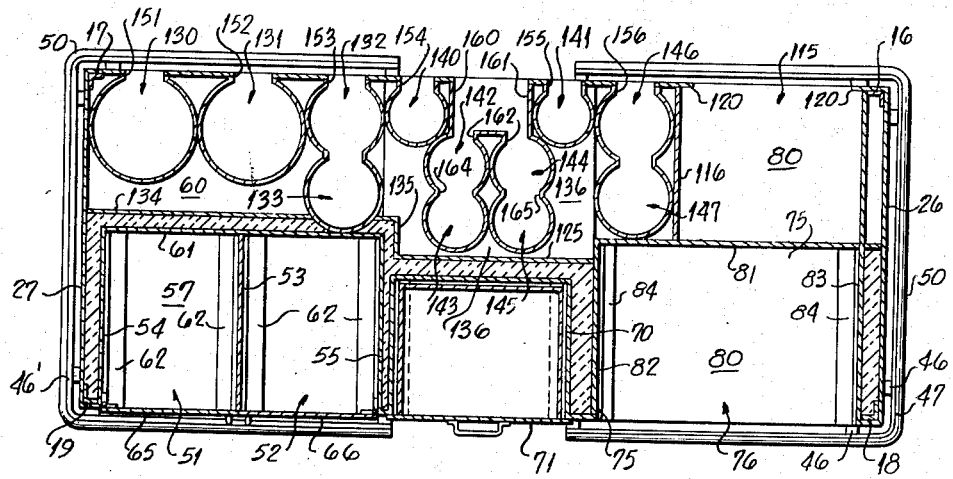

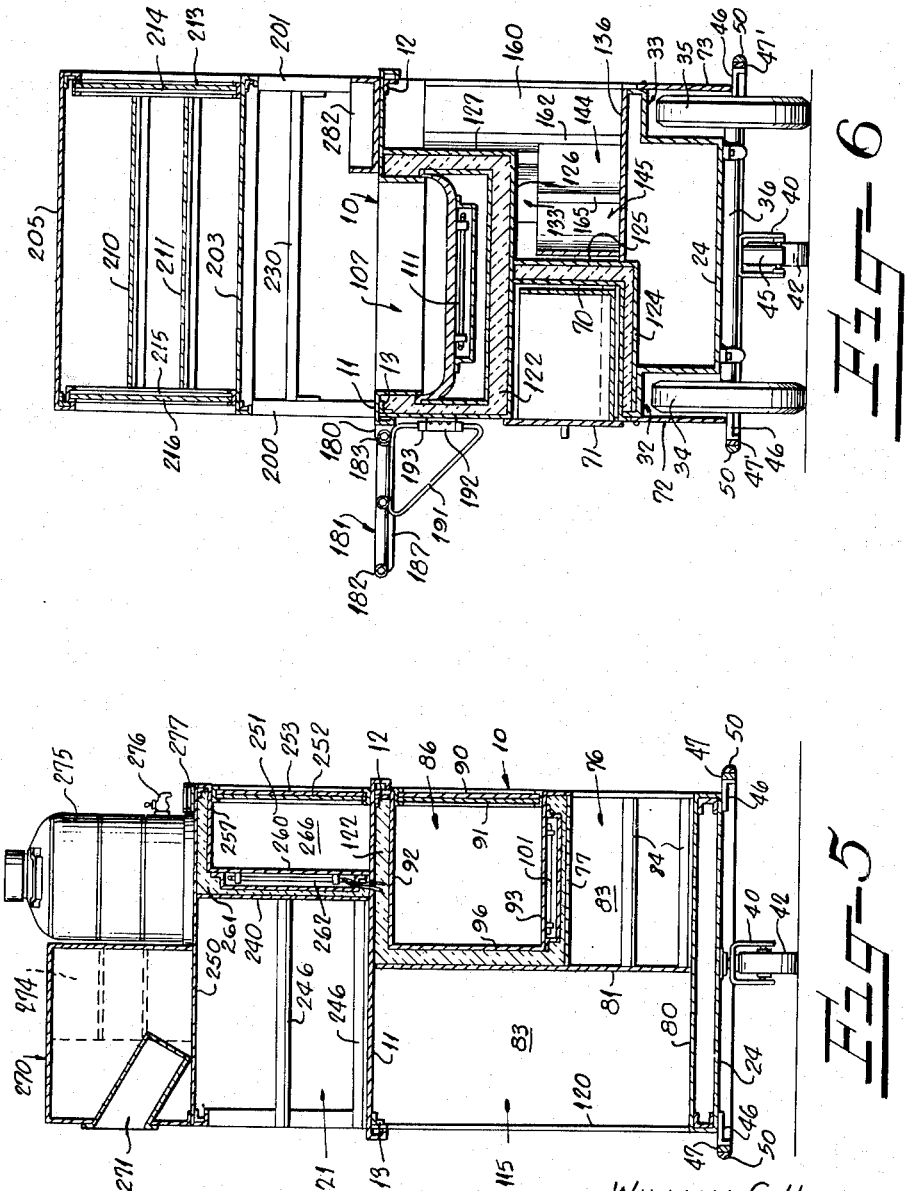

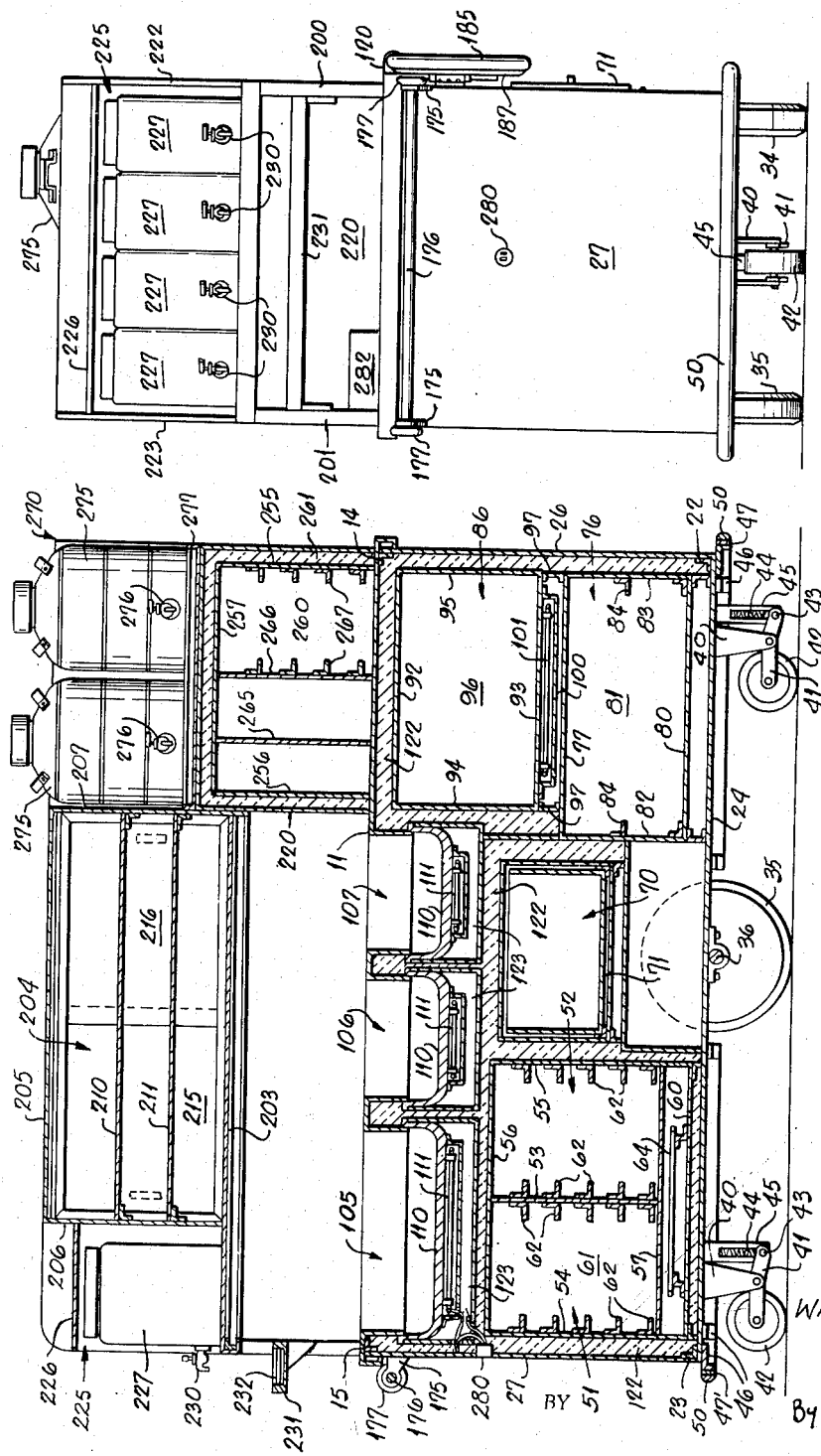

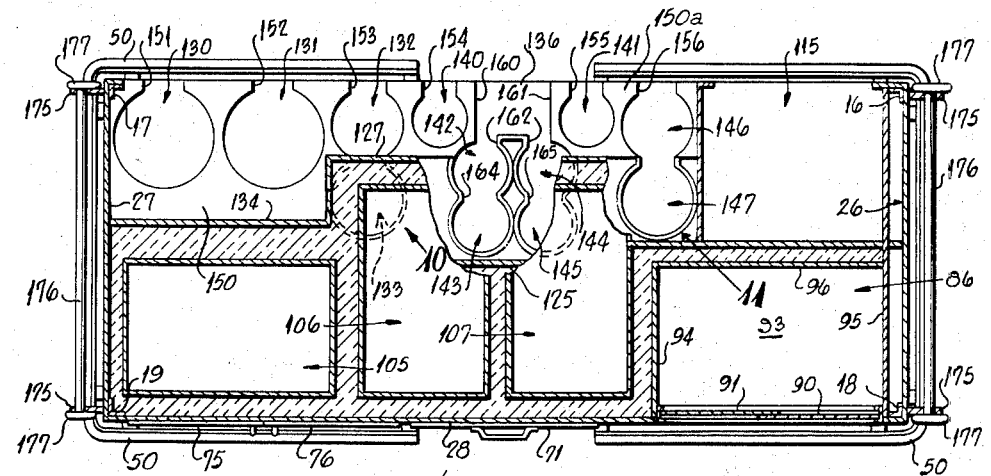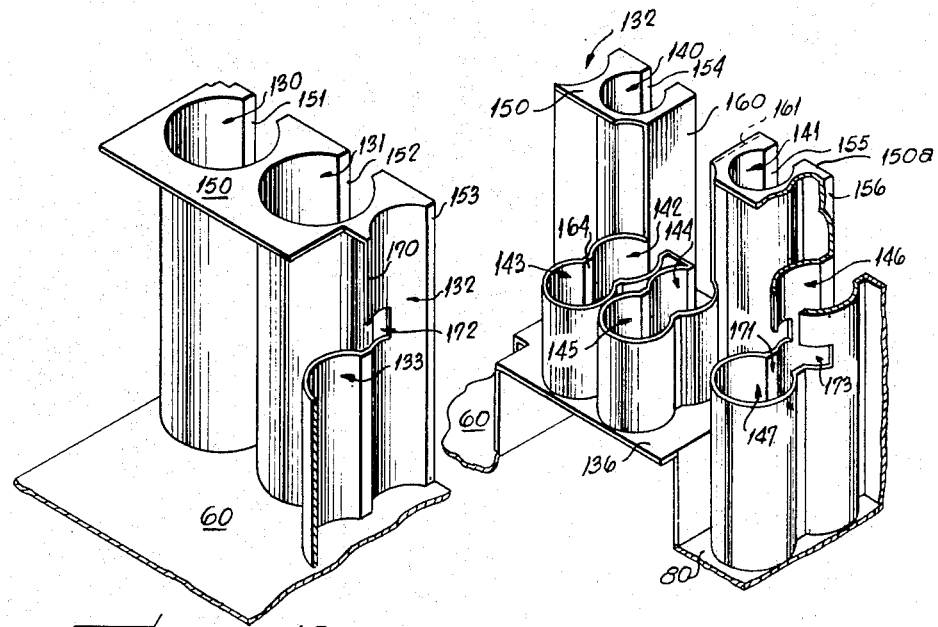

United States Patent Office 2,784,999
Patented Mar. 12, 1957

2,784,999

PORTABLE CAFETERIA BODY WITH DISH COMPARTMENTS

William G. Hunt, Florence, S. C., assignor to Hood-Gardner Hotel Supply Corporation, Charlotte, N. C., a corporation of North Carolina Application March 28, 1955, Serial No. 497,229

6 Claims. (Cl. 296—22)

This invention relates to food carts or trucks and it is the main object of this invention to provide a portable cafeteria especially adapted for use in hospitals and the like and which is so compartmented as to provide, in addition to food receiving and heating compartments, means for containing all of the various types of utensils, such as dishes, silverware, trays, etc. The improved portable cafeteria is also provided with glass encased shelves for supporting desserts, salads and the like, and beverage containers for both hot and cold beverages and, in addition, a foldable tray supporting slide or platform is provided on one side of the portable cafeteria on which each person's tray may be positioned as the various foodstuffs are retrieved from the shelves and adjacent compartments to provide an individual tray of utensils and dishes of food and beverages for each person using the cafeteria.

It is another object of this invention to provide a portable cafeteria of the character described having a substantially rectangular compartment for storing the serving trays therein and wherein the upper portion of an outer wall of the compartment is cut away to permit ingress and egress of the serving trays relative to the serving tray compartment and also wherein the central portion of the outer wall of the serving tray compartment is provided with a vertically extending opening therein to facilitate ease in grasping the serving trays and raising the same upwardly in the serving tray compartment for removing the same from the serving tray compartment.

It is still another object of this invention to provide a portable cafeteria of the character described which is provided with an outer tubular compartment provided with a slot on its outer edge and whose upper end is open whereby circular dishes and the like may be readily inserted in the upper end of each tubular compartment and may be manually supported through the slot in the tubular compartment as each successive dish is lowered to the bottom of the compartment or upon dishes previously positioned therein.

It is still another object of this invention to provide a portable cafeteria of the character provided with dish storage compartments of the type last described wherein one or more such tubular compartments is provided with an additional tubular compartment disposed inwardly or rearwardly thereof and, in order to facilitate passing the dishes from a front or outer compartment to the corresponding inner compartment, opposed side walls of the outer and inner compartments are slotted at their junctures, since the circular configuration of the compartments would normally prevent the passage of dishes or the like from one of said compartments into the other.

Some of the objects of the invention having been stated, other objects will appear as the description proceeds when taken in connection with the accompanying drawings in which—

Figure 3 is an enlarged plan view of the portable cafeteria, partially in section, taken substantially along line 3—3 in Figure 1;

Figure 4 is an enlarged sectional plan view taken substantially along line 4—4 in Figure 1;

Figure 5 is a transverse vertical sectional view taken substantially along line 5—5 in Figure 3;

Figure 6 is a transverse vertical sectional view taken substantially along line 6—6 in Figure 3;

Figure 7 is an enlarged longitudinal vertical sectional view taken substantially along the line 7—7 in Figure 3;

Figure 8 is an enlarged end elevation of the portable cafeteria looking at the left-hand side of Figures 1 and 7;

Figure 9 is an enlarged plan view, partially in section taken substantially along line 9—9 in Figure 1;

Figure 10 is an enlarged, fragmentary isometric view looking in the direction of arrow 10 in Figure 9;

Figure 11 is an enlarged, fragmentary isometric view looking in the direction of arrow 11 in Figure 9.

Figure 1:
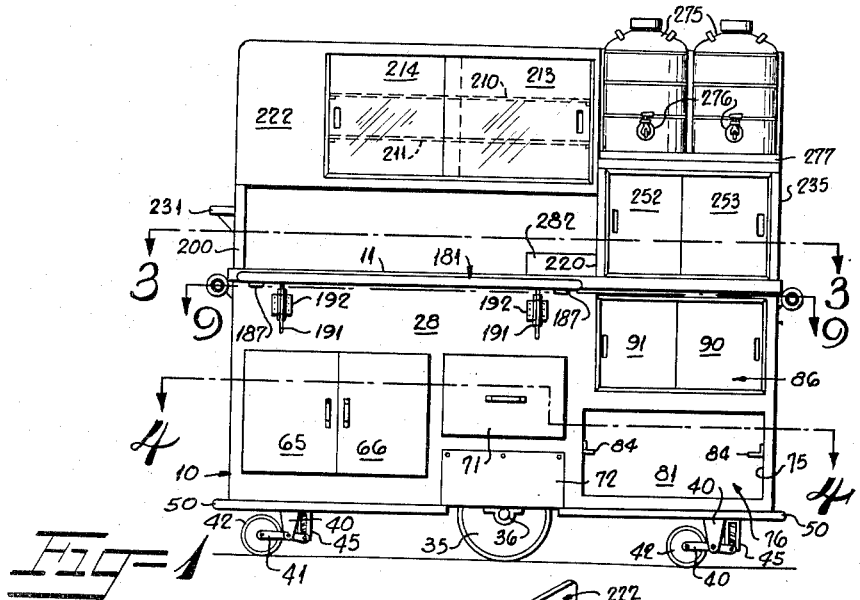
Figure 1 is a front elevation of the improved mobile or portable cafeteria.
Figure 2:
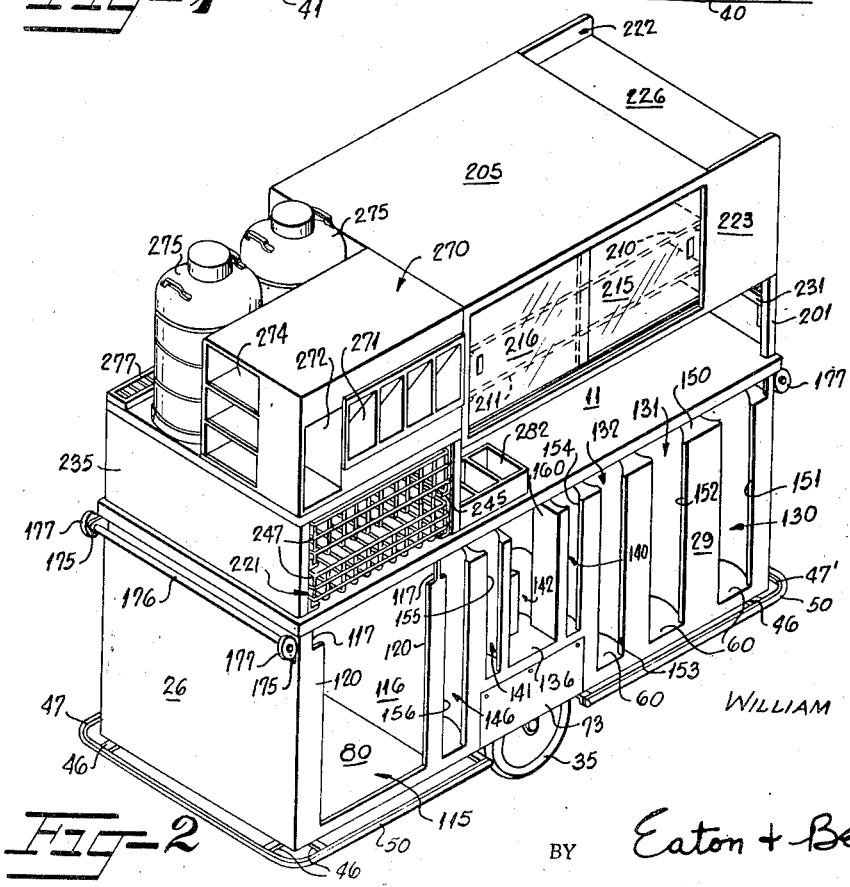
Figure 2 is an isometric view of the improved portable cafeteria looking at the opposite side from that shown in Figure 1.

Referring more specifically to the drawings, the numeral 10 broadly designates a rectangular body or casing of the portable cafeteria which comprises a main deck or platform 11 supported by a suitable framework including longitudinal upper frame members 12, 13 (Figure 5) and transverse upper side frame members 14, 15 (Figure 7). Said framework also comprises corner posts or frame members 16, 17, 18, 19 (Figure 4), whose lower ends are connected to transverse frame members 22, 23 (Figure 7) to which opposite end portions of a substantially rectangular base plate 24 are suitably secured. The framework also supports end panels 26, 27 (Figure 7) and front and rear side panels 28, 29 (Figures 1 and 2).

It will be best observed in Figure 6 that the central portion of the bottom panel or base 24 is shaped to form wheel wells 32, 33 therein in which the upper portions of main wheels 34, 35 are located, the wheels 34, 35 being journaled on an axle 36 suitably secured to the lower surface of a medial portion of the base 24. A centrally disposed wheel bracket 40 (Figures 1 and 7) is fixed to the lower surface of the base 24 adjacent each end thereof, each of the brackets 40 being of inverted substantially U-shaped construction and having medial portions of a corresponding pair of laterally spaced levers 41 journaled therebetween. Corresponding ends of each pair of levers 41 have a caster wheel 42 journaled therebetween and the other ends of each pair of links are connected by a lateral pin 43 which is engaged by the lower end of a compression spring 44 disposed in a suitable tubular housing 45 suitably secured to and depending from the base 24. The base 24 also has a plurality of clips or bumper supports 46 extending outwardly therefrom to which bumpers or bumper bars 47, 47' are secured, each of the bumper bars 47, 47' having a suitable resilient covering 50 thereon.

The casing 10 is provided with a pair of closed warming storage rack compartments or chambers 51, 52 (Figure 7) which are separated by a partition 53. The warming storage compartments 51, 52 are also formed from respective distal walls 54, 55 whose upper edges are connected to opposite ends of a top wall 56 and whose lower portions are connected to a horizontally disposed heating partition 57 and a bottom heating unit supporting wall 60. The warming storage rack chambers 51, 52 are also collectively formed by an inner or back wall 61. The proximal surfaces of the walls 53, 54, 55 are provided with vertically spaced horizontal slots or guide members 62, for supporting trays stored in the chambers 51, 52 to maintain them heated to the desired temperature. The warming storage rack chambers 51, 52 are heated by a common electrical heating unit 64 positioned in the chamber defined between the plates or bottom wall members 57, 60. The chambers 51, 52 are closed at their outer ends, at the front wall 28 of the main casing or housing 10, by suitable respective hinged doors 65, 66.

It will be observed in Figures 4, 6 and 7 that the front wall 28 of the casing or housing 10 has a drawer compartment 70 formed therein which is open at its outer end and in which a sliding drawer 71 is positioned, the sliding drawer 71 being positioned above the well 32 in which the upper portion of wheel 34 is disposed and the outer ends of the walls 32, 33 being closed by suitable removable fender plates 72, 73 (Figure 6). It will be observed in Figure 1 that the lower right-hand portion of the front wall 28 of the casing or housing 10 is provided with an opening 75 therein which communicates with an open storage rack compartment 76 comprising top and bottom walls 77, 80 (Figure 7), an inner wall 81 and opposed side walls 82, 83. The opposed side walls 82, 83 of the open storage rack compartment 76 are each provided with one or more slides or guides 84 for supporting and guiding trays of food which need not necessarily be heated.

Spaced above the open storage chamber 76 (Figure 1) is a warming oven or chamber 86 which is closed by a pair of sliding doors 90, 91 and which, in addition to the doors 90, 91, comprises top and bottom walls 92, 93 (Figure 7) and inner and outer side walls 94, 95 and a back wall 96. Suitable channel-shaped frame members 97 support the warming oven or chamber 86 in spaced relation above the upper or top wall 77 of the open storage chamber 76 and also define a heating chamber 100 in which a suitable electrical heating unit 101 is positioned for heating the warming oven 86.

It will be observed in Figures 3, 6 and 7 that the main deck 11 is provided with three relatively large substantially rectangularly-shaped food wells 105, 106, 107 in which suitable food receptacles, not shown, may be positioned for heating the same or maintaining the contents thereof heated to the desired temperature. It will be noted that each of the food wells 105, 106, 107 is provided with a refractory bottom 110 which supports therebeneath a suitable electrical heating unit 111.

The inner wall 81 of the open storage rack compartment 76 also serves as the inner wall of a serving tray compartment 115 (Figures 2, 4 and 5). The main deck 11 and base 24 serve as the top and bottom of the serving tray compartment 115 and it will be noted that the panel 83, forming one of the side walls of the open rack compartment 76, extends across the portable cafeteria and also serves as the corresponding wall of the serving tray compartment 115, the opposite wall of the serving tray compartment being indicated as 116.

It will be best observed in Figure 2 that the upper portion of the rear wall 29 of the casing or housing 10 is cutaway to form a slot 117 therein which is of the same width as the width of the serving tray compartment 115 and coincides with the walls 83, 116. The slot 117 is of relatively short vertical displacement and, below the slot 117, the wall 29 is formed with a pair of inwardly projecting ribs or restraining bar portions 120 so each successive serving tray, not shown, may be inserted into the serving tray compartment 115 through the slot 117 and then moved downwardly to be confined in the serving tray compartment 115 by the restraining bar portions 120 of the rear wall 29.

Referring to Figures 4, 5, 6 and 7, the warming storage rack compartments 51, 52, the drawer compartment 70, the warming oven compartment 86 and each of the food wells 105, 106, 107 are surrounded by an insulation material 122, such as rock wool or a fibrous asbestos material. To provide space for this insulation material, the adjacent walls of the drawer compartment 70 and the warming storage rack chamber 52 and the open storage rack chamber 76 are spaced apart from each other (Figure 4) and the outer side wall 54 of the warming storage rack compartment 51 is spaced inwardly of the end wall 27. Also, the lower portion of each of the food wells 105, 106, 107 has a walled heating element enclosure 123 thereon, the lower walls of which are spaced above the upper wall 56 of the warming storage rack compartments 51, 52 and the upper wall of the drawer compartment 70. Also, insulation-supporting horizontal and vertical wall members 124, 125 (Figure 6) are spaced from the respective bottom and inner walls of the drawer compartment 70. It will be noted that the upper wall of the drawer compartment 70 extends beyond the vertical insulation supporting member 125 to form a wall portion 126 to which the lower edge of a food well insulation retaining wall 127 is connected, said wall 127 depending from the main deck 11 of the casing 10 (Figure 6).

It will be noted that the wall 81, which serves as the inner wall of the open storage rack chamber 76 (Figures 4, 5 and 7), extends from the plate or bottom 80 of the open storage rack chamber 76 upwardly to the lower surface of the main deck and, thus, not only serves as the inner wall of the serving tray compartment 115, as heretofore described, but also serves as an insulation retaining wall, since its upper portion is spaced from the inner wall 96 of the oven compartment 86. Of course, the upper wall 92 of the warming oven compartment 86 is spaced below the main deck 11 to accommodate the insulation material 122 (Figure 5).

The plate 60 (Figure 7) which serves as a heating element confining plate for the chambers 51, 52 extends all the way across the casing 10 and serves as the bottom for a pair of circular relatively large plate or dish containing compartments or tubular members 130, 131 (Figure 4) and a first pair of circular outer and inner intermediate size plate or dish containing compartments 132, 133. The plate 60 also has the lower edge of an insulation retaining plate 134 connected thereto whose upper edge is connected to the lower surface of the main deck 11 and which retaining plate 134 is spaced from the inner wall 61 of the two warming storage rack compartments 51, 52. A vertically disposed angle plate 135 is connected at its upper end to the wall 126 and one leg or flange thereof is connected to the vertically disposed wall 125.

The lower edge of the angle plate 135 is connected to the upper surface of a small-dish-chamber-supporting platform or bottom 136 (Figures 2, 4, 6, 9 and 11) whose outer edge is connected to the rear wall 29 of the casing 10 and whose inner edge is connected to the wall 125. It will be noted that the relatively small-dish-compartment-supporting platform 136 is spaced above the fender well 33 in which the upper portion of wheel 35 is disposed. In order to utilize all of the available surface area of the relatively small-dish-compartment-supporting platform 136, it will be observed in Figures 3, 4, 9 and 11 that the platform 136 supports two outer substantially circular small-size-dish-containing chambers or tubular members 140, 141 which are spaced from each other, and inwardly of and between which two pairs of intermediate outer and inner substantially circular small-size-dish-containing chambers 142, 143 and 144, 145 are disposed. The plate 80, which serves as a bottom for the open rack storage compartment 76 and the serving tray compartment 115, also serves as a bottom for a second pair of outer and inner substantially circular intermediate size dish compartments 146, 147 which are positioned adjacent the opposite side of the platform 136 from which the first pair of intermediate-size-dish-containing compartments 132, 133 are disposed.

The spaces between the upper ends of the walls of all of the dish containing compartments 130, 131, 132, 133 and the corresponding portions of vertical walls 134, 127 are closed by a common plate 150 (Figures 2, 9, 10 and 11) which is spaced a relatively small distance below the main deck 11, the upper portions of the rear wall of the casing 10 being cut-away at its juncture with the plate 150, so the dishes may be inserted in and withdrawn from the corresponding dish containing compartments between the upper surface of the plate 150 and the lower surface of the main deck 11. Also, a plate 150a, on the same level as plate 150, closes the spaces between circular chambers 141, 146, 144 and walls 161, 127.

Now, it is apparent, by referring to Figures 3, 4 and 6 that the portion of the plate 126 disposed rearwardly of the insulation retaining wall 125 and the portion of the insulation retaining wall which extends beneath the food wells 106, 107 overlie the first and second inner intermediate size dish compartments 133, 147 and portions of the two intermediately positioned outer small-size-plate compartments 142, 144 and entirely overlie the inner small size plate or dish compartments 143, 145. Thus, the substantially circular or segmental walls of the compartments 133, 142 to 145, inclusive, and 147 terminate in spaced relation below the plate 126 as shown in Figure 6 and, consequently, their upper edges are disposed on a substantially lower level than the upper edges of the segmental walls or substantially circular walls of the outer compartments 130, 131, 132, 140, 141 and 146. Thus, novel means are provided to gain access to the relatively short dish containing compartments 133, 142 to 145, inclusive, and 147 as best shown in Figures 10 and 11.

In order to enable the operator to support the dishes as they are lowered or raised in the outer dish-containing tubes or chambers 130, 131, 132, 140, 141, 146, it will be noted that the latter compartments and the rear wall 29 have respective coinciding vertically extending slots or passageways 151 to 156, inclusive, which extend from the cover plate 150 down to the corresponding plates 60, 136, 80 which define the bottoms of the dish containing compartments.

Since the intermediate small-dish compartments 142, 144 are disposed inwardly of and partially between the outer small dish compartments 140, 141 the upper edges of the arcuate walls thereof terminate on a lower level than the upper edges of the walls of the outer small dish compartments 140, 141. A passageway is provided between the outer small dish compartments 140, 141 by means of a pair of upright plates 160, 161 which define an opening in the rear wall 29 of the casing 10. The plates 160, 161 also define the distal walls of vertically extending slots 162 so that relatively small dishes may be inserted through the passageway defined by the plates 160, 161 and over the upper edge of the proximal portions of the walls of the small dish compartments 142, 144 and then held in the hand of the operator as they are lowered into or withdrawn from the relatively short intermediate small dish compartments 142, 144. It will also be noted that the junctures of the compartments 142, 143 and 144, 145 are provided with corresponding slots 164, 165 which establish communication therebetween and which are of less width than the diameter of the intermediate and inner small dish compartments 142 to 145, inclusive.

Since the right-hand portion of the plate 126 in Figure 6 overlies the intermediate and rear small dish compartments 142 to 145, inclusive, it is thus seen that the dishes to be placed in and/or removed from any of the small-dish compartments 142 to 145, inclusive, may be passed through the opening or passageway provided between the plates 160, 161 and between the lower surface of the horizontal plate 126 and the upper ends of the circular small-dish compartments 142 to 145, inclusive. Now, since the inner intermediate-size-dish-compartments 133, 147 are of substantially lesser height than the corresponding outer intermediate sized dish compartments 132, 146, and are disposed beneath the rear portion of the plate 126 (Figure 6), the curvature of the walls of the intermediate-size-dish-compartments 132, 133 and 146, 147 at the junctures thereof would normally prevent movement of the intermediate size dishes in horizontal position therebetween. Thus, in order to facilitate movement of the dishes between the compartments 132, 133 and the compartments 146, 147, it will be observed that the inner portions of the walls of the outer compartments 132, 146 are cut away at the finger openings 170, 171 to form slots 172, 173, the slots 172, 173 preferably being disposed immediately above the level of the upper end of the corresponding intermediate-size-dish compartments 133 or 147. This means facilitating the passage of circular dishes between circular relatively tall outer compartments and substantially circular relatively short inner compartments constitutes one of the most important features of the present invention.

In order to facilitate moving the improved portable cafeteria from one place to another, each of the end panels 26, 27 has a pair of brackets 175 fixed to the upper portion thereof adjacent opposite side edges thereof in which opposite ends of a handle rod 176 are mounted. Each end of each handle rod 176 has a resilient roller or bumper 177 thereon.

It will be observed in Figures 1, 3, 6 and 8 that the down-turned front flange of the main deck 11 has a pair of bearing blocks or pivot blocks 180 thereon in which the rear portion of a skeleton-like serving tray slide 181 is pivotally mounted. The serving tray slide 181 may be of any desired construction and is shown as comprising an endless rectangularly-shaped body including inner and outer longitudinal frame members 182, 183 and transverse end frame members 184, 185 each of which is preferably circular in cross-section in order to minimize the weight of the serving tray slide.

Disposed inwardly of the transverse frame members 184, 185 are auxiliary transverse frame members 186, 187 whose opposite ends are fixed to the lower surfaces of the longitudinal frame members 182, 183 and whose medial portions support a centrally disposed longitudinal frame member 190. In order to support the tray slide 181 in the substantially horizontal position shown in Figure 6, two angle brackets 191 are provided whose vertical legs are pivotally mounted for movement about vertical axes in respective brackets 192 suitably secured to the front panel or wall 28 of the casing 10. Suitable collars 193 are provided on the vertical leg of each of the brackets 191 to prevent vertical movement of the angle brackets 191 relative to the respective bearing blocks 192.

Thus, when the angle brackets 191 occupy the operative position or outwardly projected position shown in Figures 3 and 6, it is apparent that they will maintain the pivoted tray slide 181 in the raised or horizontal position. The inner horizontal longitudinal frame member 182 of the tray slide 181 is spaced sufficiently from the down-turned front flange of the main deck 11 so that, when the angle brackets 191 are swung inwardly, they will be disposed between the vertical planes of the down-turned front flange of the main deck 11 and the inner surface of the inner longitudinal frame member 182 of the tray slide 181 as shown in Figure 8 to thereby permit the tray slide 181 to depend from the pivot blocks 180 in a substantially vertical position as shown in Figure 8.

*Superstructure*

The main deck 11 supports a superstructure including a pair of laterally spaced upright corner posts 200, 201. The upper ends of the superstructure corner posts 200, 201 support one end of an auxiliary or upper deck or platform 203 which serves as the bottom of a display cabinet broadly designated at 204. The display cabinet 204 also includes a top wall 205 and opposed end walls 206, 207, the walls 205, 206, 207 preferably being made from sheet metal. The walls 206, 207 support a pair of vertically spaced horizontally disposed shelves 210, 211 which are preferably made from a transparent material, such as glass or the like, and on which various desserts and salads may be positioned. The front and rear walls of the display cabinet 204 are shown in the form of sliding transparent doors 214, 213 and 215, 216, respectively. It will be observed in Figures 1, 2 and 7 that the upper or auxiliary deck 203 is not as long as the main deck 111 and its end remote from the corner posts 200, 201 is connected to the medial portion of a vertically disposed wall member 220 which is disposed adjacent the food well 107 and serves as one of the walls of a cup-rack compartment broadly designated at 221. The front and rear doors 213, 214 and 215, 216 are mounted in front and rear superstructure wall members 222, 223 which wall members extend outwardly or to the left in Figure 7 beyond the vertical wall 206 of the display cabinet 204 and serve as the front and rear walls of a cold beverage compartment broadly designated at 225.

The cold beverage compartment 225 is also provided with an upper wall 226, opposed ends of which are suitably secured to the proximal surfaces of the front and rear superstructure walls 222, 223. The auxiliary deck or upper deck 203 serves as the bottom of the cold beverage compartment 225. The cold beverage compartment is provided for containing a plurality of cold beverage containers such as are indicated at 227 (Figure 8), and each of which preferably has a pet-cock or valve 230 thereon for dispensing the beverage therefrom. The top wall 226 of the cold beverage compartment 225 is preferably spaced from the upper edges of the front and rear walls 222, 223 to serve as a shelf on which various articles may be positioned. A suitable drip tray 231 is spaced beneath the pet-cocks 230 of the cold beverage containers 227, the drip tray 231 being suitably supported between the corner posts 200, 201 and being provided with a suitable grid 232 thereon. Of course, the grid 232 on the drip tray 231 serves to support glasses, cups or the like into which the beverage may be dispensed from any one of the cold beverage containers 227.

The cup rack compartment 221 also includes an outer wall 235 spaced substantially from the inner wall 220 and being suitably secured to corresponding corner posts 236, 237 carried by the main deck 11 (Figure 3). A partition 240 also serves as one of the walls of the cup-tray compartment 221, the partition 240 being suitably secured to upright angle bars or frame members 241, 242. It will be noted that the lower portion of the wall 220 is also supported at the rear of the casing 10 by an upright corner post or frame member 243. Suitable rack supporting bars 245, 246 are suitably secured at their rear or outer ends to the corner posts 243, 237, respectively, and their front or inner ends are suitably secured to the upright frame members or angle bars 241, 242. The guide bars 245, 246 are provided for supporting wire cup racks such as are indicated at 247 in Figure 2, the wire cup racks being omitted from the other views for purposes of clarity.

It will be noted that the partition 240 (Figures 3 and 5) and the front portions of the walls 220, 235 and the top wall 250 of the cup-tray-supporting chamber 221 serve as insulation retaining walls for an auxiliary or secondary warming oven 251 whose front is closed by sliding doors 252, 253. The deck 11 serves as the bottom of the secondary or auxiliary warming oven 251 and the warming oven 251 also includes opposed end walls 255, 256 and a top wall 257 and an inner or rear wall 260, the walls 255, 256, 257, 260 being spaced from the respective walls 235, 220, 250, 240 to accommodate an insulation material 261, such as fiber glass or rock wool therebetween. Also, the inner or rear wall of the secondary warming oven 251 has a suitable electrical heating unit 262 thereon.

The secondary warming oven 251 has a pair of longitudinally spaced vertically disposed partitions 265, 266 therein, the proximal surfaces of the partition 266 and the wall 255 being provided with angle bars or slide tracks 267 thereon for supporting trays or the like containing food which is to be maintained hot or tepid. Of course, the chambers defined by the partitions 265, 266 and the partition 265 and the wall 256 may also be used for warming bread and other pastries and the like.

The top wall 250 of the cup rack storage compartment 221 also serves as the bottom wall of a cubically shaped housing broadly designated at 270 and whose rear wall has a plurality of angularly disposed bins 271 therein for containing napkins and the like and which rear wall also has a pitcher chamber 272 for containing pitchers of cream and the like. The side wall of the cubical housing 270 which corresponds to the end wall 26 of the casing 10 also preferably has a plurality of horizontal vertically spaced shelves 274 therein. The front portion of the horizontal wall 250 may support one or more heated beverage containers such as are indicated at 275 and each of which has a pet-cock or valve 276 thereon beneath which a suitable grid covered drip tray 277 is disposed. The drip tray 277 is supported on the foremost portion of the horizontal wall member 250.

All of the electrical heating units 64, 101, 111 and 262 are preferably electrically connected in parallel with a suitable female electrical socket or plug 280 mounted in the end wall 27 (Figure 8) which may be connected to a suitable electric cord leading from a suitable source of electrical energy, not shown. If so desired, a suitable silver tray 282 (Figure 2) may be placed upon the main deck 11 for containing silverware and other utensils.

It is thus seen that I have provided a compact self-contained, portable cafeteria which is not only provided with ample means for supporting heated and cooled foods but is also provided with a novel arrangement of dish containing compartments for accommodating dishes of various sizes and wherein all of the usable space is utilized by providing inner circular dish compartments with means to facilitate insertion of the dishes in the inner compartments. It is also seen that I have provided a portable cafeteria wherein a serving tray slide is provided which may normally fold against the front wall of the mobile cafeteria during movement thereof from one place to another and which may be swung to horizontal position and maintained in such position during its use.

In the drawings and specification there has been set forth a preferred embodiment of the invention and, although specific terms are employed, they are used in a generic and descriptive sense only and not for purposes of limitation, the scope of the invention being defined in the claims.

I claim:

1. A portable cafeteria comprising a wheeled casing having opposed end walls and front and rear side walls thereon, a plurality of upright substantially vertically disposed outer dish receiving compartments disposed inwardly of and adjacent said rear wall, said rear wall having a plurality of vertically extending slots therein communicating with said dish receiving compartments and being of substantially less width than the diameter of the dish receiving compartments, at least one inner dish receiving compartment disposed inwardly of one of said outer dish receiving compartments and the proximal walls of the inner and one outer dish receiving compartments having a communicating vertically disposed slot therein extending at least the full length of the inner dish receiving compartment, the upper end of said inner dish receiving compartment terminating on a substantially lower level than the upper end of the corresponding outer dish receiving compartment, and the inner wall portion of said one outer dish receiving compartment having a lateral slot therethrough to facilitate the passage of dishes therethrough.

2. A device according to claim 1 wherein said casing is provided with a main deck, and said dish receiving compartments terminate below said main deck.

3. A structure according to claim 1 wherein the dish receiving compartments are substantially circular in plan.

4. In a portable cafeteria having a casing with opposed end walls and front and rear side walls, a plurality of upright substantially vertically disposed outer dish receiving compartments disposed inwardly of and adjacent said rear wall, each of said compartments being substantially circular in plan and having a vertically extending slot therein of less width than the width of the compartment, a plurality of inner dish receiving compartments disposed inwardly of said outer dish receiving compartments and corresponding therewith, the proximal walls of each of the corresponding inner and outer dish receiving compartments having a communicating vertical slot therein extending at least the full length of the inner dish receiving compartment, and the inner wall portion of the outer corresponding dish receiving compartment having a lateral slot therethrough to facilitate the passage of dishes therethrough into said inner dish compartment.

5. In a device according to claim 4 wherein said lateral slot is disposed immediately above the level of the upper end of said inner dish receiving compartment.

6. A portable cafeteria comprising a wheeled casing having opposed end walls and front and rear side walls thereon, a plurality of upright substantially vertically disposed outer dish receiving compartments disposed inwardly of and adjacent said rear wall, said rear wall having a plurality of vertically extending slots therein communicating with said dish receiving compartments and being of substantially less width than the width of the dish receiving compartments, an inner dish receiving compartment disposed inwardly of at least one of said outer dish receiving compartments, and the proximal walls of the inner and said one outer dish receiving compartment having an elongated vertically disposed slot therein extending at least the full length of the inner dish receiving compartment, and the inner wall portion of said one outer dish receiving compartment having a lateral slot therethrough to facilitate the passage of dishes therethrough into said inner dish compartment.

References Cited in the file of this patent

UNITED STATES PATENTS

| | | |
|---|---|---|
| 1,582,659 | Baker | Apr. 27, 1926 |
| 1,964,805 | Barnes | July 3, 1934 |